United States Patent [19]

Coates

[11] E Patent Number: Re. 32,495

[45] Reissued Date of Patent: Sep. 8, 1987

[54] CHIP RELIEF FOR ROCK BITS

[75] Inventor: J. Randall Coates, Tonkawa, Okla.

[73] Assignee: Smith International, Inc., Newport Beach, Calif.

[21] Appl. No.: 832,312

[22] Filed: Feb. 24, 1986

Related U.S. Patent Documents

Reissue of:

[64] Patent No.: 4,513,829
Issued: Apr. 30, 1985
Appl. No.: 569,060
Filed: Jan. 9, 1984

U.S. Applications:

[63] Continuation-in-part of Ser. No. 337,929, Jan. 8, 1982, abandoned.

[51] Int. Cl.[4] ..... E21B 10/18

[52] U.S. Cl. ..... 175/339; 175/356

[58] Field of Search ..... 175/213, 215, 224, 331, 175/339, 340, 354, 356, 369, 370

[56] References Cited

U.S. PATENT DOCUMENTS

| | | | |
|---|---|---|---|
| 1,174,576 | 3/1916 | Hughes | 175/377 |
| 2,057,026 | 10/1936 | Harrington | 175/356 |
| 3,111,179 | 11/1963 | Albers et al. | 175/393 |
| 3,138,213 | 6/1964 | Brandon | 175/339 |
| 3,420,324 | 1/1969 | Vesper | 175/339 |
| 4,022,285 | 5/1977 | Frank | 175/340 |
| 4,372,399 | 2/1983 | Cork | 175/339 |

FOREIGN PATENT DOCUMENTS

| | | | |
|---|---|---|---|
| 652311 | 3/1979 | U.S.S.R. | 175/340 |

OTHER PUBLICATIONS

Piggot, R. J. S., "Mud Flow in Drilling", Drilling and Production Practices, API (1941), pp. 91-103.

Allen, James H., "How to Relate Bit Weight and Rotary Speed to Bit Hydraulic Horsepower", Drilling DCW, May 1975.

Gray, K. E., "The Cutting Carrying Capacity of Air at Pressure Above Atmospheric", M.S. Thesis, University of Tulsa, Oklahoma, (1957).

*Primary Examiner*—James A. Leppink
*Assistant Examiner*—William P. Neuder
*Attorney, Agent, or Firm*—Christie, Parker & Hale

[57] ABSTRACT

This invention relates to roller cone, air circulation type rock bits. Means are provided on the rock bit body as well as on the shirttail portion of each of the legs extending from the body to provide a relief to pass rock chips from the borehole bottom and up the drill string as the air circulation roller cone bit works in a formation.

5 Claims, 4 Drawing Figures

CHIP RELIEF FOR ROCK BITS

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 337,929, filed Jan. 8, 1982 *now abandoned.*

BACKGROUND OF THE INVENTION

1. Field of the Invention

This invention relates to air circulation roller cone rock bits.

More particularly, this invention relates to moderate to high velocity and volume air circulation roller cone rock bits and a means formed in the rock bit to enhance rock chip removal from a borehole bottom as the bit works in the earth formation.

2. Description of the Prior Art

It is well known in the rock bit art to provide well fortified rock bit legs in multi-cone rock bits to assure that the rock bit maintains "gage" of a borehole while working in a formation. The leading edges of the shirttail portions of most of these bits are hardfaced to resist erosion of the bit shirttail since the shirttail portion is almost the same diameter as the cutting end of the rock bit. Additionally, the back of the leg is often studded with flush-type tungsten carbide inserts to resist erosion wear caused by the legs coming in contact with the borehole wall.

In petroleum drilling where the clearance around the rock bit is minimal, the liquid or drilling "mud" circulating fluid pumped into the drill string is sufficiently viscous to suspend the cuttings within itself and carry them out of the borehole at a relatively low rate of flow. With the introduction of air drilling, basic bit geometry did not change and the generally large detritus material in the borehole bottom [cound] *could* not be carried out of the hole by the less dense and less viscous air until the rock particles were reduced in size by regrinding by the bit. Regrinding the detritus slowed down the formation penetration rate of the bit and shortened the life of the bit. The reground rock chips tend to dull the cutters and wear away the shirttail portion of the bit. In addition, the finely ground particles get into the bearing surfaces formed between the roller cones and the journals supported by the bit, further limiting bit life. It is imperative then that the borehole cuttings be immediately removed from the borehole bottom so that the bit cutting surface is continually exposed to uncut rock as it penetrates the formation.

The relative rock cuttings transport capabilities of liquid and gas drilling fluids are defined in the following analysis. Table 1 lists properties of rock cuttings transport capabilities of the fluids.

TABLE 1

| Properties of Rock Drilling Fluids | | | | |
|---|---|---|---|---|
| FLUID | TEMPERATURE Fahrenheit | ABSOLUTE PRESSURE pounds per square inch | DENSITY pounds per cubic feet | VISCOSITY pounds per foot-second |
| Air | 64 | 14.7 | 0.076 | $12.3 \times 10^{-6}$ |

TABLE 1-continued

| Properties of Rock Drilling Fluids | | | | |
|---|---|---|---|---|
| FLUID | TEMPERATURE Fahrenheit | ABSOLUTE PRESSURE pounds per square inch | DENSITY pounds per cubic feet | VISCOSITY pounds per foot-second |
| Air | 165 | 54.7 | 0.236 | $14.1 \times 10^{-6}$ |
| Air | 165 | 314.7 | 1.359 | $14.1 \times 10^{-6}$ |
| Water | 68 | — | 62.4 | $6.73 \times 10^{-4}$ |
| Mud | 68 | — | 75.0 | $336 \times 10^{-4}$ |
| Mud | 68 | — | 135.0 | $504 \times 10^{-4}$ |

A small spherical particle falling under the action of gravity through a viscous medium ultimately acquires a constant velocity expressed by Stokes' Law.

$$v = \frac{2ga^2(d_1 - d_2)}{9_z}$$

where v = velocity (feet per second)

g = gravitational acceleration (feet per second per second)

a = radius of the sphere (feet)

$d_1$ = density of the sphere (pounds per cubic foot)

[$d_1$] $d_2$ = density of the medium (pounds per cubic foot)

z = viscosity (pounds per foot second)

Using nominal particle size of one-eighth inch radius, particle density of 158 pounds per cubic foot, drilling mud density of 75 pounds per cubic foot, drilling mud viscosity of 0.0336 pounds per footsecond, and standard gravitational acceleration, we have:

$$v = \frac{2(32.2)(0.0104)^2(158 - 75)}{9(0.0336)} = 1.9 \text{ feet per second}$$

$$v = 115 \text{ feet per minute}$$

In theory, the velocity of the drilling mud up the annular area between the drilled hole wall and the outside diameter of the drill pipe must exceed this velocity to transport the assumed spherical rock cutting particle out of the drilled hole. In practice, most drilled rock cuttings tend to be flat or [lenz-shaped] *lens-shaped* and Piggot[1] suggests that the probable velocity will be about 40 percent of that calculated by the above equation. This gives good agreement with nominal drilling mud velocities encountered in practice and Allen[2] where this velocity (called slip velocity) does not exceed 50 percent of the drilling mud annular velocity:

v(slip) = 115 feet per minute × 40% = 46 feet per minute

Mud annular velocity = v(slip) 46 feet per minute × 2 = 92 feet per minute

Stokes' law is applicable to viscous fluids only and cannot be applied to gaseous fluids. Even for high density air (314.7 pounds per square inch absolute pressure) the velocity becomes:

$$v = \frac{2(32.2)(0.0104)^2(158 - 1.359)}{9(0.0000141)} = 8598 \text{ feet per second}$$

$$v = 515880 \text{ feet per minute}$$

which is obviously absurd.

Where air is the cooling, lubricating, and flushing medium Gray[3] developed the following equation for rock cutting particle velocity (slip velocity):

$$v = \frac{.9456(2_a)T(d_1)}{p}$$

Where:

T = Bottom hole temperature (degrees Rankine)

P = Bottom hole pressure (pounds per square inch absolute)

Using the same rock particle data and air at 54.7 pounds per square inch absolute pressure, 160° Fahrenheit (625° Rankine) temperature, and assuming bottom hole pressure equal to delivered pressure:

$$v = \frac{.9456(.0208)625(158)}{54.7} = 35.5 \text{ feet per second}$$

$$v = 2130 \text{ feet per minute}$$

For slip velocity at 50 percent of annular velocity we have:

Air Annular Velocity = V(slip)2130×2 = 4260 feet per minute

Annular fluid volume flow from:

$$Q = VA$$

Where:

Q = annular fluid volume flow (cubic feet per minute)

V = annular fluid velocity (feet per minute)

A = annular area (square feet)

For an 8½ inch diameter rock bit with 5 inch outside diameter drill pipe, the annular area is 0.258 square feet and the annular fluid volume flow will be:

$$Q_{mud} = 92(0.258) = 23.7 \text{ cubic feet per minute}$$

$$Q_{air} = 4260(0.258) = 1099 \text{ cubic feet per minute}$$

These fluid velocities and volumes are typical for mud and air drilling conditions.

In this analysis, the mud and air drilling annular areas are equal for transporting the same size of particle. It should be noted, however, that the selected rock particle size is most closely related to the relatively low drilling penetration rates associated with mud drilling.

It should also be noted that the selected rock particle density is most closely related to that of the shales, limestones, and sandstones associated with petroleum deposits where mud drilling is practiced. In mud drilling, the annular area and rock bit to hole wall clearance around the bit body are more than adequate. The flow of the incompressible mud is governed by bit nozzle diameters of less cross-sectional area than either the rock bit body clearance or the drilled hole annular area. Mud flow velocity through the nozzles, and therefore mud volume, is restricted by nozzle wear, cavitation effects, turbulence, pressure differentials, and available hydraulic horsepower.

Generally, air drilling produces large rock particle sizes and high drilling penetration rates, particularly for blast-hole drilling in surface mining where 50 foot maximum hole depths are typical. The compressible air flows contracting and expanding down the drill pipe, through rock bit nozzles and open air passages through the rock bit bearings, around the bit cutting structures and body, and up the drill pipe annular area. The annular area is usually adequate, but the rock bit to hole wall clearance around the bit body is often inadequate if designed to mud drilling standards. Additional bit body clearance is required for many air drilling applications to permit [passages] *passage* of large rock particles and the greater volume of air required to transport the larger particles. Drilling penetration rates and related rock particle sizes commonly encountered in mud and air drilling are compared in Table 2.

TABLE 2

Penetration Rates and Common Rock Particle Sizes

| DRILLING CONDITIONS | MUD DRILLING | AIR DRILLING |
|---|---|---|
| Slow Drilling Rate | | |
| Penetration rates (feet per hour) | <3 | <30 |
| Rock particle large dimensions (inches) | <¼ | <¼ |
| Moderate Drilling Rate | | |
| Penetration rates (feet per hour) | 3-20 | 30-100 |
| Rock particle large dimensions (inches) | ¼ | ¼-½ |
| High Drilling Rate | | |
| Penetration rates (feet per hour) | >20 | >100 |
| Rock particle large dimensions (inches) | >¼ | >½ |

The volume of rock cuttings passed over the bit body and up the drilled hole annular area is not significant for mud or air drilling. Table 3 shows the volume of rock particles removed from an 8½ inch diameter hole (0.394 square feet cross-sectional area) at various penetration rates.

TABLE 3

Volume of Rock Particles Removed

| Penetration Rate (feet per hour) | Penetration Rate (feet per minute) | Volume of Rock Removed (cubic feet per minute) |
|---|---|---|
| 3 | 0.05 | 0.019 |
| 10 | 0.17 | 0.065 |
| 30 | 0.50 | 0.197 |
| 60 | 1.00 | 0.394 |
| 100 | 1.67 | 0.652 |

For a penetration rate of 160 feet per hour and using slip velocities equal to 50 percent of the fluid velocities previously calculated (92 feet per minute for mud drilling and 4260 feet per minute for air drilling), the areas required to transport the rock cuttings will be:

$$A = \frac{Q}{V}$$

$$A_{mud} = \frac{1.051(\text{cubic feet per minute})}{92 \times .5(\text{feet per minute})} = 0.023 \text{ square feet}$$

which is less than 10 percent of the annular area (0.258 square feet)

$$A_{air} = \frac{1.051(\text{cubic feet per minute})}{4260 \times .5(\text{feet per minute})} = 0.0005 \text{ square feet}$$

which is less than 0.2 percent of the annular area.

Using Gray's equation, the larger rock particle sizes for moderate (⅜ inch rock particle large dimensions) to high (½ inch rock particle large dimensions) air drilling rates will produce a corresponding increase of one and one-half to two times the air velocity (6390 to 8520 feet per minute) and resulting air volume (1649 to 2198 cubic feet per minute) flowing in the drilled hole annular area.

Although the relatively high penetration rate air drilling practices of surface mining are possible in petroleum drilling, the constraints of directional control, maintaining hole diameter for emplacing casing, and avoiding bit damage to preclude premature removal of a lengthy drill string from a deep hole dictate deliberately slow drilling. In contrast, surface mining blast hole air drilling permits rough directional control, rough hole diameter control, since casing is not emplaced, and is virtually insensitive to bit damage and bits are drilled to destruction. Consequently, higher penetration rates and larger chips, with a corresponding requirement for greater clearance between the mining bit body and the drilled hole wall, are normal for virtually all surface mining air drilling relative to petroleum drilling.

As a practical matter, the clearance between a bit body and the drilled hole wall cannot be greater than the clearance between the shoulder of the threaded connection at the threaded pin end of the bit. This clearance is further restricted by the requirement for bit shirttail structural integrity, including allowances for lubricating and cooling passages. Using the bit cross-sectional clearance area through the threaded jet nozzles relative to the drilled hole annular area we have the following typical ratios:

Petroleum bit ratio=0.28

Mining bit ratio=0.37

Mining air drilling bit clearance areas should be at least 37 percent of the available area and should be about 30 percent more than that of a comparable petroleum mud drilling bit.

Experience has shown that in state of the art mining bits, the penetration rate is slow, wear rate is rapid and a heightened erosion rate of the shirttail leg portion of each of the bits is evident. Therefore, the present invention overcomes these major problems in the mining industry. This is accomplished through careful removal of material from the shirttail portion of the rock bit, thus providing greater clearance so the rock chips or detritus may more easily pass from the borehole bottom up the drill string and out of the formation.

SUMMARY OF THE INVENTION

It is an object of this invention to provide a mining bit with superior means to pass detritus from a borehole bottom to the surface of a formation.

More particularly, it is an object of this invention to provide an air circulation mining bit that has selected portions of the shirttail of each of the legs of the rock bit removed to enhance chip removal from the borehole bottom.

This invention relates to an air circulation, air lubricated rock bit commonly used in the mining industry. The bit consists of a rock bit body having a first cutting end and a second pin end, the body forming a chamber therein. The chamber communicates with circulation air through an opening formed in the second pin end of the bit, the pin end of course being connected to a drill string. At least a pair of legs extend from the rock bit body (there are normally three legs in a three cone rock bit), each leg forming a shirttail portion [in] *and* a journal bearing, each journal bearing serving to support a roller cutter cone at a first cutting end of the bit. Cutting elements, such as tungsten carbide rock bit inserts, are positioned adjacent the largest diameter of each of the roller cones. These inserts serve to form the means to cut the gage (major diameter of the borehole) of a borehole in a formation.

There is at least one nozzle formed in the dome area of the bit body, the nozzle being in communication with the chamber within the bit. The nozzle directs air past each roller cone into the borehole to lift detritus or rock chip material out of the bottom of the borehole. Relief means are formed in each of the legs. The relief means serve to pass the rock chips or detritus material from the borehole past the rock bit body and out of the borehole.

An annular space is provided between an outer surface of the bit body, including the leg portion and walls formed by the borehole. [The annular space, in a plane perpendicular to an axis of the bit, about adjacent an exit end of the nozzle, is thirty-five percent or more of the area formed by the borehole through the plane.] A cross-sectional area *in a plane perpendicular of the axis of the bit,* of the [resulting] bit body clearance, measured through the jet nozzles *about adjacent an exit end of the nozzles* (the jet nozzles are typically threaded), exceeds thirty-five percent of the cross-sectional annular [areas defined by] *area between* the shoulder of the threaded pin end or connection and the drilled borehole wall and increases as the bit cross section approaches the shouldered connection.

Additionally, each of the legs extending from the rock bit include channel-type grooves on the leading and trailing edge of each of the legs to further enhance rock chip removal from the borehole by relieving further the material of each leg of the rock bit body.

An advantage then over state of the art rock bits is the removal of material from the body of the bit to provide greater space for the removal of rock chips from a borehole bottom.

Yet another advantage over the state of the art air circulation rock bits is the elimination of the need to hardface a portion of the leg, namely the leading edge of the shirttail, to prevent erosion of the leg as it comes in contact with a borehole wall.

Still another advantage is the elimination of the need to further protect the shirttail portion of the leg of a rock bit by embedding flush-type tungsten carbide inserts into the surface of the shirttail to further prevent erosion of this portion of the rock bit as it works in a borehole.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
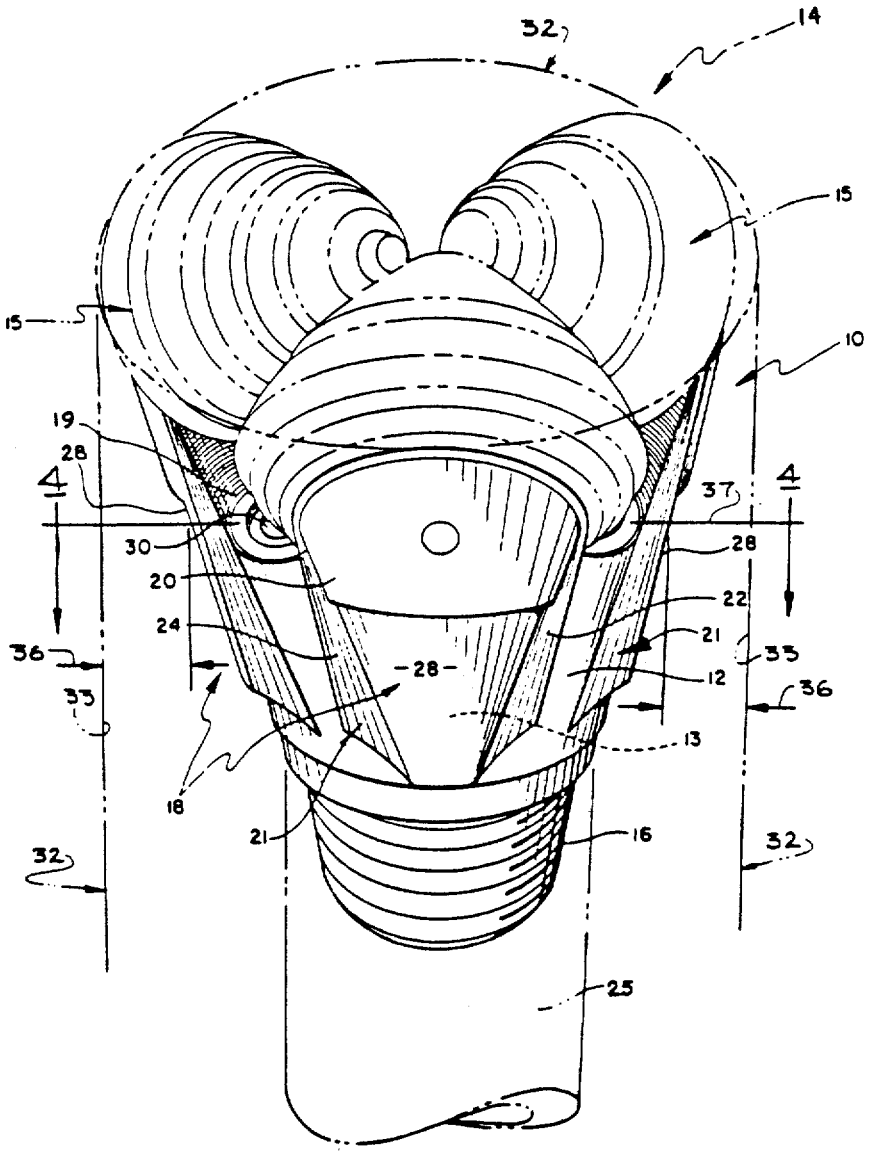
FIG. 1 is a perspective view of a typical air circulation mining bit illustrating the relieved portions of the bit that enhance rock chip removal from the borehole bottom.

With reference now to FIG. 1, the rock bit, generally designated as 10, is comprised of a bit body 12 having a cutting end 14, shown in phantom. The cutting end 14 forms a borehole, generally designated as 32, in an earth formation. At the opposite end of bit body 12 is pin end 16, adapted to be connected to a drill string 25 (shown in phantom) of a drilling rig. Within the bit body 12 is formed a chamber 13 (not shown), the chamber directing fluid, such as air, through the pin end 16 into chamber 13 and out of nozzle 30 inserted through dome 19 of the rock bit body 12. Three legs, generally designated as 18, extend from bit body 12. Each leg 18 forms a shirttail portion 20. Shirttail portion 20 is relieved above the cutter cones 15 in area 28 by removing material therefrom. The shirttail then is stepped down from the cones toward the pin end 16 of rock bit body 12. In addition to relieving material from the leg in the area shown as 28, the leg is further reduced in size by providing a scalloped or concave groove 21, formed in both the leading edge 22 and the trailing edge 24 of the legs 18. Normally, the shirttail portion of a standard rock bit leg is much more massive than is shown in FIG. 1. Since the leg shirttail portion is nearly as large as the gage of the rock bit in standard bits, the shirttail needs to be protected as heretofore described. The instant invention circumvents the need for protection of the shirttail by simply removing material from the shirttail to both prevent erosion of the leg of the rock bit as well as enhance rock chip removal, the latter being the more important of the two.

An annular space 36 is shown between the rock bit body 12 and the borehole wall 33. The annular space or cross-sectional area 36 through a plane 37, perpendicular to an axis of the bit approximately through an exit end of the jet nozzles 30, is at least thirty-five percent of the *annular* cross-sectional area [formed by] *defined by the shoulder of the threaded pin end or connection and the wall of* the borehole 32 [through the plane 37].

Figure 2:
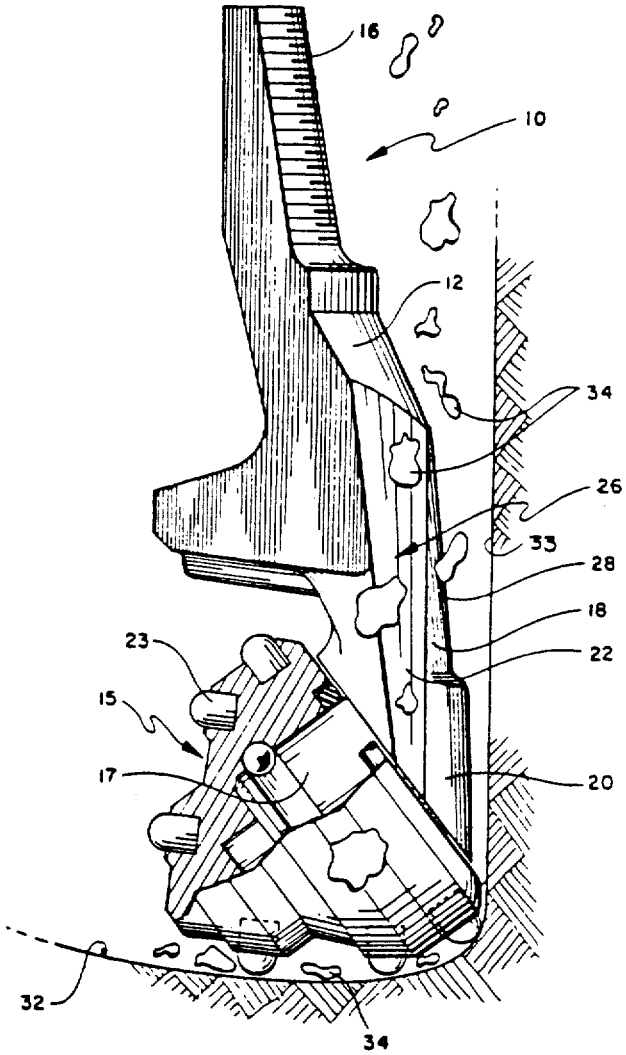
FIG 2 is an illustration of one leg of a typical three cone rock bit partially in cross section, illustrating the relieved portions of the leg along the shirttail surface to enhance removal of rock chips.

Turning now to FIG. 2, the leg portion is shown in a borehole 32. Cone 15 is illustrated in contact with the bottom of the borehole and, as the roller cone rotates in the borehole bottom, the cutting elements (tungsten carbide inserts 23) scrape, gouge, and crush the formation, thus creating detritus or rock chips 34 which must be removed from the borehole bottom. In mining bits, air is used as both a bit lubricant and a means to remove detritus from the borehole bottom. Air is directed through the nozzle 30 (FIG. 1) toward the borehole bottom and the rock chips 34 are blown out of the borehole bottom past the bit body and up the borehole 32. The rock bit leg then is relieved by removing material from the shirttail 20 in the area indicated as 28 and by providing a concave groove 21 in the leading and trailing edges 22 and 24 of the leg 18 of the rock bit body 12. Detritus 34 than easily pases by the cutter cones 15, past the bit body 12 and up the borehole, being enhanced by the relieved portions in both the shirttail surface and the leading and trailing edges of the leg 18 of the bit 10.

Figure 3:
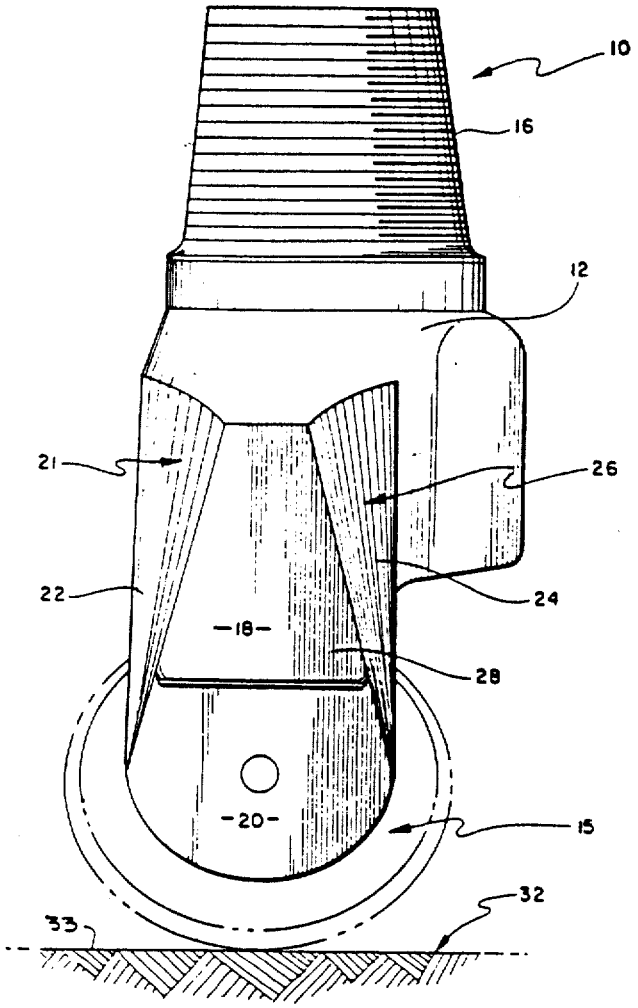
FIG. 3 is a side view of one leg of a rock bit, illustrating the relieved portions of each leg to enhance chip removal.

With reference now to FIG. 3, the bit body 12, being turned 90° from FIG. 2, further illustrates the areas of the leg 18 which are removed, namely the stepped area 28 of the shirttail portion 20 and the scalloped grooves 21 along the leading edge 22 and trailing edge 24.

Figure 4:
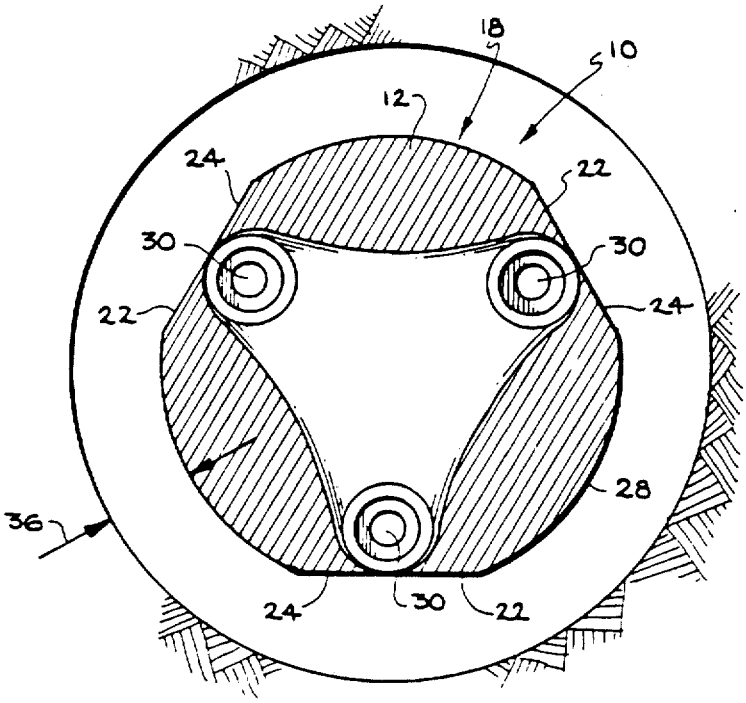
FIG. 4 is a view taken through 4—4 of FIG. 1, illustrating the annular hole wall clearance between the borehole wall and the bit body.

Turning now to FIG. 4, the annular space 36 through plane 37 defines a cross-sectional area at least thirty-five to thirty-seven percent of the *annular* cross-sectional area [formed by] *defined by the shoulder of the threaded pin end or connection and* the walls 33 of the borehole 32. The cross-hatched portion of the illustration represents each of the legs that support cutter cones 15. As heretofore mentioned, jet air nozzles 30 direct compressed gaseous fluid toward the borehole bottom to lift variously sized detritus out of the borehole.

This relatively simple procedure produced a dramatic increase in borehole penetration in the mining field. For example, recent tests have revealed a standard 6¾ inch mining bit, without chip relief, would normally cut 2500 feet of earth formation. A 6¾ inch bit with chip removal features as taught in this invention, in the very same formation, cut 4500 feet of earth formation, resulting in a 77% increase in rock bit performance. Several bits were run to confirm this phenomenal increase in rock bit penetration with an average increase in performance of about 75% overall. This indeed is a new and unusual result from a rock bit modification, especially in air circulation mining bits. Field reports have shown that chip grooves, such as the scalloped grooves 21 in leading edges 22 and trailing edges 24 of the rock bit, adds significantly to chip flow with increased bit life and performance. It was also confirmed that the chip relief is equally effective for milled tooth and tungsten carbide insert bits, the latter being illustrated in the instant invention. Field engineers have observed that when large rock bit stabilizers are attached to the rock bits, the diameter of the stabilizer being near the diameter of the borehole, rock chip removal is again inhibited, even with a bit with chip relief. This observation confirmed that rock chips or detritus is reground over and over again to enable them to finally pass by the large diameter stabilizer. Where stabilizers are used in conjunction with air circulation bits with chip relief, the diameter of the stabilizer must be reduced accordingly to complement the modified bit and its greater capacity to pass detritus material thereby. Where this practice is followed, a 75% increase in bit performance can be expected. Air flow through an air circulation bit must have a clear path of escape once it passes through the nozzles 30 of the rock bit. Free flow of air is needed if remilling or recutting of the chips is to be prevented. Engineering tests confirm that mining bits, as modified by the teachings of this invention, do indeed exhibit increased rock bit penetration rates. The life of the cutting end of the bit is prolonged with a more efficient means to remove more and larger detritus from the borehole bottom, thus contributing to the phenomenal increase in rock bit efficiency and performance.

Chip relief for sealed bearing rock bits used in the oilfield will enhance their performance as well. Detritus material washed out of the bottom of a borehole by drilling mud will more easily pass by the bit with chip relief.

It will of course be realized that various modifications can be made in the design and operation of the [presend] *present* invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

REFERENCES

[1]Piggot, R. J. S., "Mud Flow in Drilling", Drilling and Production Practices, API (1941), pp. 91-103

[2]Allen, James H., "How to Relate Bit Weight and Rotary Speed to Bit Hydraulic Horsepower", Drilling DCW, May 1975

[3]Gray, K. E., "The Cutting Carrying Capacity of Air at Pressure Above Atmospheric", M.S. Thesis, University of Tulsa, Oklahoma (1957)

I claim:

1. An air circulation, air lubricated, roller cone rock bit comprising:

a rock bit body having a first cutting end and a second threaded pin end *having a shoulder*, said body forming a chamber therein, said chamber communicates with said circulation air through an opening formed in said second pin end, said pin end being connected to a drill string, at least a pair of legs extending from said bit body, each leg forming a shirttail portion and a bearing, each bearing serves to support a roller cutter cone at said first cutting end of said bit, cutting elements adjacent the largest diameter of each roller cone form a gage of a borehole in a formation, at least one nozzle formed in said bit body in communication with said chamber, said nozzle directs air past each roller cone into said borehole to lift detritus material out of the bottom of the borehole, and relief means formed by said legs, said relief means serves to pass said detritus material from the bottom of said borehole by the rock bit body and out of said borehole by providing an annular space between an outer surface of said legs and walls formed by said borehole, said annular space, in a plane perpendicular to an axis of said bit, about adjacent an exit end of said at least one nozzle, is thirty-five percent or more of the *annular* area [formed by] *between the shoulder of the threaded pin end and the walls of* said borehole [through said plane], said annular space progressively enlarges in perpendicular planes between said exit end of said at least one nozzle and a shoulder formed in said bit body, said shoulder forms a thread termination base end for said second threaded pin end of said rock bit.

2. An air circulation, air lubricated, roller cone rock bit comprising:

a rock bit body having a first cutting end and a second threaded pin end, said body forming a chamber therein, said chamber communicates with said circulation air through an opening formed in said second pin end, said pin end being connected to a drill string, at least a pair of legs extending from said bit body, each leg forming a shirttail portion and a bearing, each bearing serves to support a roller cutter cone at said first cutting end of said bit, cutting elements adjacent the largest diameter of each roller cone form a gage of a borehole in a formation, at least one nozzle formed in said bit body in communication with said chamber, said nozzle directs air past each roller cone into said borehole to lift detritus material out of the bottom of the borehole, and relief means formed by said legs, said relief means serves to pass said detritus material from the bottom of said borehole by the rock bit body and out of said borehole by providing an annular space between an outer surface of said legs and walls formed by said borehole, said annular space progressively enlarges in perpendicular planes between said exit end of said at least one nozzle and a shoulder formed in said bit body, said shoulder forms a thread termination base end for said second threaded pin end of said rock bit, said relief means formed by said legs include channel grooves formed in the sides of the leg in a leading edge and a trailing edge of said shirttail portion of said leg, said relief means formed by said legs further include a space formed between said shirttail portion of each of said legs and said wall of said borehole, said space is formed by relieving the surface of said shirttail substantially paralleling said borehole wall, said leading and trailing edge grooves and said relieved portion of said shirttail portion paralleling said borehole wall serve to enhance the removal of relatively large detritus material from the bottom of said borehole, a cross-sectional area of said annular space measured in a plane through said *at least* one [or more] nozzle exceeds thirty-five percent of the cross-sectional annular space [defined by] *between* said shoulder of the second threaded pin end and the borehole wall [and increases as the bit cross section approaches said shoulder of said second pin end of said bit].

*3. An air circulation, air lubricated roller cone rock bit comprising:*

*a rock bit body having a first cutting end and a second threaded pin end for connection to a drill string;*

*a shoulder on the bit body forming a thread termination base for the second threaded pin end of the rock bit;*

*an interior chamber in the body communicating with circulation air from the drill string through an opening formed in the second pin end of the bit body;*

*at least a pair of legs extending downwardly from the bit body, each leg including a shirttail portion at the outside of the bit body and adjacent to the wall of a bore hole drilled by such a rock bit, each leg also comprising a bearing supporting a roller cutter cone at the first cutting end of the bit, such a roller cone including cutting elements adjacent to the largest diameter of the roller cone for forming the gage of a bore hole drilled by such a rock bit;*

*at least one air nozzle in the bit body in communication between the chamber and the exterior of the bit body for directing air past each roller cone into a bore hole to lift detritus material out of the bottom of the bore hole; and*

*an annular space between the outer surface of the bit body and walls formed by such a bore hole drilled by the rock bit for passing the detritus material from the bottom of the bore hole past the rock bit body and out of the bore hole, the cross-sectional area of the annular space between the outside surface of the rock bit body and the walls of the bore hole in a plane at the exit end of such a nozzle being at least 35% of the cross-sectional area of the annular area between said shoulder of the threaded pin end and the bore hole wall, the cross-sectional area of the annular space progressively increasing in successive planes perpendicular to the axis of the rock bit from a lower portion of the shirttail to the shoulder.*

*4. A rock bit as recited in claim 3 further comprising a longitudinally extending channel groove in each of the leading edge and trailing edge of the shirttail portion of each leg.*

*5. A rock bit as recited in claim 4 wherein each of the channel grooves progressively increases in size from the lower end of the shirttail portion toward the pin end of the rock bit.*

* * * * *